(12) United States Patent
Lischefski

(10) Patent No.: US 7,201,966 B2
(45) Date of Patent: *Apr. 10, 2007

(54) PACKAGING FILMS CONTAINING COEXTRUDED POLYESTER AND NYLON LAYERS

(75) Inventor: Andrew John Lischefski, Oshkosh, WI (US)

(73) Assignee: Curwood, Inc., Oshkosh, WI (US)

( * ) Notice: Subject to any disclaimer, the term of this patent is extended or adjusted under 35 U.S.C. 154(b) by 251 days.

This patent is subject to a terminal disclaimer.

(21) Appl. No.: 10/795,567

(22) Filed: Mar. 8, 2004

(65) Prior Publication Data

US 2004/0170851 A1   Sep. 2, 2004

Related U.S. Application Data

(63) Continuation-in-part of application No. 10/237,949, filed on Sep. 9, 2002.

(51) Int. Cl.
*B32B 27/06* (2006.01)
*B32B 27/08* (2006.01)
*B32B 27/28* (2006.01)
*B32B 27/34* (2006.01)
*B32B 27/00* (2006.01)

(52) U.S. Cl. .................. 428/474.4; 528/480; 528/483; 528/475.8; 528/475.5; 528/475.2

(58) Field of Classification Search ............. 428/474.4, 428/483, 480, 475.2, 475.5, 475.8
See application file for complete search history.

(56) References Cited

U.S. PATENT DOCUMENTS

| | | | | |
|---|---|---|---|---|
| 4,726,997 A | * | 2/1988 | Mueller et al. ............. | 428/480 |
| 4,808,482 A | * | 2/1989 | Benge et al. ............. | 428/411.1 |
| 5,139,878 A | | 8/1992 | Kim et al. | |
| 6,037,063 A | | 3/2000 | Muschiatti et al. | |
| 6,555,190 B1 | * | 4/2003 | Tsai ......................... | 428/36.6 |
| 6,685,861 B2 | * | 2/2004 | Akkapeddi et al. ......... | 264/241 |
| 6,893,730 B2 | * | 5/2005 | Moulton et al. ......... | 428/474.4 |
| 6,964,816 B2 | * | 11/2005 | Schell et al. ............. | 428/474.4 |

FOREIGN PATENT DOCUMENTS

| | | |
|---|---|---|
| EP | 0 638 487 B1 | 1/1994 |
| EP | 0 476 836 B1 | 11/1995 |
| EP | 1 142 704 A1 | 10/2001 |
| EP | 1 207 042 A1 | 5/2002 |
| WO | WO 98/37141 | 8/1998 |

OTHER PUBLICATIONS

Derwent Publications Ltd., London, GB; Section Ch. Week 199816; AN 1998-173601 XP002262961 & JP 10 034852 A (Mitsubishi Plastics Ind Ltd), (Feb. 10, 1998)—abstract.
Derwent Publications Ltd., London, GB; Section Ch. Week 199530; AN 1995-227254 XP002262962 & JP 07 096582 A (Mitsubishi Plastics Ind Ltd), (Apr. 11, 1995)—abstract.

* cited by examiner

*Primary Examiner*—P. Hampton Hightower
(74) *Attorney, Agent, or Firm*—Tom J. Hall

(57) ABSTRACT

Multilayer coextruded thermoformable structures for packaging film applications. The multilayer structures having at least a first layer comprising polyethylene terephthalate, a second layer of a first adhesive comprising a blend of at least an acrylate-based resin and either a modified polyolefin or a modified acrylate-based resin; a third layer of a thermoplastic oxygen barrier. The thermoplastic oxygen barrier may comprise ethylene/vinyl alcohol copolymer (EVOH), polyvinylidene chloride, or polyamide, preferably, a polyamide blend containing between 1–29% amorphous polyamide. The present invention may further comprise at least 5–7 thermoplastic layers.

75 Claims, 2 Drawing Sheets

PACKAGING FILMS CONTAINING COEXTRUDED POLYESTER AND NYLON LAYERS

CROSS-REFERENCE TO RELATED APPLICATIONS

This application is a continuation-in-part application claiming the benefit of co-pending U.S. patent application Ser. No. 10/237,949, filed Sep. 9, 2002, which is incorporated herein in its entirety.

BACKGROUND OF THE INVENTION

The present invention relates to flexible coextruded multilayer films for use as packaging film or as a component thereof. Particularly, the invention relates to coextruded multilayer films which are thermoformable and have oxygen barrier properties.

Flexible multilayer thermoforming films are used to package food and medicinal articles, thereby protecting these articles against external contamination and abuse, and therein providing an attractive package for the article for its eventual sale. There is great commercial interest in the packaging industry for a film structure, which provides superior mechanical strength, better optical and gas barrier properties, and particularly, improved thermoformability.

SUMMARY OF THE INVENTION

The present invention is directed to a coextruded multilayer thermoformable film comprising at least a first layer of polyethylene terephthalate; a second layer of a first adhesive comprising a blend of at least an acrylate-based resin and either a modified polyolefin or a modified acrylate-based resin, preferably a blend comprising between 25–99% (by weight relative to the total weight of the second layer), more preferably, between 25–60% of an acrylate-based resin, and between 1–75% (by weight relative to the total weight of the second layer), more preferably, 10–75% of either a modified polyolefin or a modified acrylate-based resin, and between 0–30% (by weight relative to the total weight of the second layer) of an unmodified polyolefin; a third layer which includes a thermoplastic oxygen barrier, preferably a thermoplastic oxygen barrier comprising polyamide, ethylene/ vinyl alcohol copolymer, polyvinylidene chloride or blends thereof, more preferably, a polyamide blend.

Preferably, the coextruded multilayer thermoformable film is non-oriented.

Preferably, a first surface of the second layer is directly adhered to the first layer and a second surface of the second layer is directly adhered to the third layer.

Preferably, the acrylate-based resin of the first adhesive may be selected from the group consisting of ethylene/vinyl acrylate copolymer (EVA), ethylene/methacrylate copolymer (EMA), ethylene/butyl acrylate copolymer (EBA) or blends thereof. Preferably, the modified polyolefin in the first adhesive may be an anhydride-modified polyolefin, and the modified acrylate-based resin of the first adhesive may be an anhydride-modified acrylate resin. More preferably, the anhydride-modified polyolefin may comprise a polyolefin selected from the group consisting of polyethylene, ethylene/α-olefin copolymer, or blends thereof, and the anhydride-modified acrylate-based resin may be selected from the group consisting of anhydride-modified ethylene/ vinyl acrylate copolymer (EVA), anhydride-modified ethylene/methacrylate copolymer (EMA), anhydride-modified ethylene/butyl acrylate copolymer (EBA), or blends thereof. Preferably, the unmodified polyolefin may include a material selected from the group consisting of polyethylene, ethylene/α-olefin copolymer, polypropylene, polybutylene or blends thereof The third layer may comprise any suitable thermoplastic oxygen barrier, e.g., polyamide, ethylene/vinyl alcohol copolymer, polyvinylidene chloride or blends thereof. Preferably, the thermoplastic oxygen barrier includes a blend of polyamides, more preferably, a blend comprising between about 71–99% (wt.) of a crystalline polyamide and between about 1–29% (wt.) of an amorphous polyamide, and most preferably, about 85% (wt.) of a crystalline polyamide and about 15% (wt.) of an amorphous polyamide.

In accordance with the present invention, the three-layer coextruded multilayer thermoformable film may be used alone, i.e., a packaging film for food and/or non-food items. For certain packaging applications, it may be beneficial to include the three-layer film as a substructure in a larger multilayer flexible film. In such a configuration, the larger multilayer film incorporating three-layer structure as a substructure may advantageously possess properties and benefits resulting from the three-layer structure as discussed herein, but may also possess additional properties and benefits arising from the additional layers. Larger multilayer film structures which incorporate three-layer structure as a substructure may have at least one additional layer adhered to this substructure by various methods known to those skilled in the art which include thermal lamination, adhesive lamination, coextrusion coating, coextrusion lamination.

In another embodiment of the present invention, the coextruded thermoformable film may further include a fourth and fifth layer. In one example of this embodiment, the fourth layer may comprise a second adhesive which is free of an acrylate-based resin, and the fifth layer may comprise a sealant, preferably selected from the group consisting of polyethylene, ethylene/α-olefin, propylene/α-olefin, butylene/α-olefin, ionomer, acrylate resin, or blends thereof. In another example of a five-layer embodiment, the second layer and fourth layer may each comprise a first adhesive having the acrylate-based resin and a modified polyolefin or modified acrylate-based resin wherein the acrylate-based resin is selected from the group consisting of ethylene/vinyl acrylate copolymer (EVA), ethylene/methacrylate copolymer (EMA), ethylene/butyl acrylate copolymer (EBA) or blends thereof, and the fifth layer may include a polyester, preferably selected from the group consisting of polyethylene terephthalate, polybutylene terephthalate, polynaphthalene terephthalate, and copolymers or blends thereof.

Preferably, the five-layer embodiment of the present invention is non-oriented.

In still another embodiment, the five-layered coextruded thermoformable film may be a packaging film or a component thereof for storing food and/or non-food items.

In yet another embodiment of the present invention, the film may further include a sixth layer and a seventh layer, but is not limited to seven layers. In a first example of a seven-layer embodiment, the second layer and sixth layer may each comprise a second adhesive free of an acrylate-based resin, and the seventh layer may include a sealant, preferably one selected from the group consisting of polyethylene, ethylene/α-olefin, propylene/α-olefin, butylene/α-olefin, ionomer, acrylate resin, or blends thereof.

In a second example of a seven-layer embodiment of the present invention, the second layer may comprise a first adhesive having the acrylate-based resin and a modified polyolefin or modified acrylate-based resin wherein the acrylate-based is selected from the group consisting of ethylene/vinyl acrylate copolymer (EVA), ethylene/methacrylate copolymer (EMA), ethylene/butyl acrylate copolymer (EBA) or blends thereof, the sixth layer may include a second adhesive free of an acrylate-based resin, and the seventh layer may include a sealant, preferably, one selected from the group consisting of polyethylene, ethylene/α-olefin, propylene/α-olefin, butylene/α-olefin, ionomer, acrylate resin, or blends thereof.

In a third example of a seven-layer embodiment, the second layer and sixth layer may each comprise a first adhesive having the acrylate-based resin and a modified polyolefin or modified acrylate-based resin wherein the acrylate-based resin is selected from the group consisting of ethylene/vinyl acrylate copolymer (EVA), ethylene/methacrylate copolymer (EMA), ethylene/butyl acrylate copolymer (EBA) or blends thereof, and the seventh layer may comprises a polyester, preferably, selected from the group consisting of polyethylene terephthalate, polybutylene terephthalate, polynaphthalene terephthalate, and copolymers or blends thereof.

In a fourth example of a seven-layer embodiment, all the layers may be identical to that used in the second example of this embodiment, except for the fourth layer which may include a second adhesive free of an acrylate-based resin.

In yet still another embodiment of the present invention, the coextruded seven layer thermoformable film may be used as a packaging film or component thereof for storing food and/or non-food items.

Preferably, the seven layered embodiment of the present invention is non-oriented.

Preferably, films of the present invention may have a total thickness equal to or less than about 16 mils (0.04064 cm).

Preferably, films of the present invention may have a total thickness equal to or less than about 10 mils (0.0254 cm).

Preferably, films of the present invention may have a total thickness between about 3–7 mils (0.00762–0.01778 cm).

Preferably, films of the present invention may have an unrestrained linear thermal shrinkage in the machine direction or the transverse direction of less than 5% at 90° C. as measured in accordance with ASTM D-2732 test method.

Preferably, films of the present invention may have an unrestrained linear thermal shrinkage in the machine direction or the transverse direction of less than 2% at 90° C. as measured in accordance with ASTM D-2732 test method.

Preferably, films of the present invention may contain less than 500 ppm of a transition-metal salt selected from the group consisting of manganese II, manganese III, iron II, iron III, cobalt II, cobalt III, nickel II, nickel III, copper I, copper II, rhodium II, rhodium III, rhodium IV, and ruthenium.

Preferably, films of the present invention may have a gloss value greater than about 65 Hunter Units (Hip) as measured in accordance with ASTM D-2244-85 test method.

Preferably, films of the present invention may have an oxygen transition rate less than about 1.0 $cm^3/100$ $in.^2$ (15.5 $cm^3/m^2$) as measured in accordance with ASTM D-3985-81 test method.

Preferably, films of the present invention may have an elongation at break in the machine direction and in the transverse direction of greater than 250% at room temperature as measured in accordance with ASTM D-882-95 test method.

DETAILED DESCRIPTION OF THE INVENTION

Figure 1:
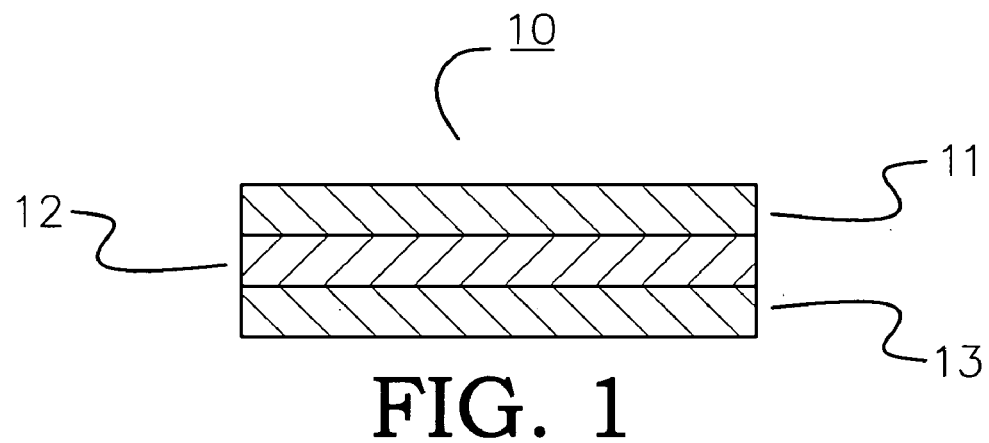
FIG. 1 is a cross-sectional view of a multilayer structure having three layers according to the present invention.

As used herein, the term "multilayer" refers to a plurality of layers in a single film structure generally in the form of a sheet or web which can be made from a polymeric material or a non-polymeric material bonded together by any conventional means known in the art, i.e., coextrusion, extrusion coating, and lamination, vacuum vapor deposition coating, solvent coating, emulsion coating, or suspension coating or combination of one or more thereof. The multilayer film of the present invention may include as many layers as desired, preferably, at least three layers.

As used herein, the term "thermoformable" refers to films which are capable of being formed into a desired shape upon the application of heat, and are thermoformed about the product on a support member by means of heat and differential pressure. In the thermoforming process, virtually all of the air is evacuated from the interior of the package so that the film conforms very closely to the contour of the packaged product. Generally, sufficient heat is applied to cause the film to bond with the support member outside the periphery of the product, either by forming the film and support member from materials that are otherwise compatible upon the application of heat, e.g., by employing similar heat-sealable polymeric materials, at the seal interface that bond to one another when heated or by employing a heat-activated adhesive at the interface of the film and support member.

As used herein, the phrase "thermoplastic material" refers to a polymer or polymer mixture that softens when exposed to heat and returns to its original condition when cooled to room temperature. In general, thermoplastic materials include, but are not limited too, synthetic polymers such as polyamides, polyolefins, polyalkyl acrylates, polyesters, ethylene/vinyl alcohol copolymers, and the like. Thermoplastic materials may also include any synthetic polymer that are cross-linked by either radiation or chemical reaction during a manufacturing process operation.

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith.

As used herein, the term "copolymer" refers to polymers formed by the polymerization of reaction of at least two different monomers. For example, the term "copolymer" includes the co-polymerization reaction product of ethylene and an α-olefin, such as 1-hexene. The term "copolymer" is also inclusive of, for example, the co-polymerization of a mixture of ethylene, propylene, 1-propene, 1-butene, 1-hexene, and 1-octene. As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer.

As used herein, terminology employing a "/" with respect to the chemical identity of a copolymer (e.g., polyvinylidene chloride/methyl acrylate copolymer), identifies the comonomers which are copolymerized to produce the copolymer.

As used herein, the term "polyester" refers to homopolymers or copolymers having an ester linkage between monomer units which may be formed, for example, by condensation polymerization reactions between a dicarboxylic acid and a glycol. The dicarboxylic acid may be linear or aliphatic, i.e., oxalic acid, malonic acid, succinic acid, glutaric acid, adipic acid, pimelic acid, suberic acid, azelaic acid, sebacic acid, and the like; or may be aromatic or alkyl substituted aromatic, i.e., various isomers of phthalic acid, such as paraphthalic acid (or terephthalic acid), isophthalic acid and naphthalic acid. Specific examples of alkyl substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid. The glycols may be straight-chained or branched. Specific examples include ethylene glycol, propylene glycol, trimethylene glycol, 1,4-butane diol, neopentyl glycol and the like. In one example a preferred embodiment of this invention, the first layer comprises polyethylene terephtalate copolymer and most preferable, biaxially-oriented polyethylene terephthalate copolymer.

As used herein, the term "biaxially-oriented" refers to a polymer web or sheet which forms a film structure in which the web has been elongated in two directions at elevated temperatures followed by being "set" in the elongated configuration by cooling the material while substantially retaining the elongated dimensions. This combination of elongation at elevated temperature followed by cooling causes an alignment of the polymer chains to a more parallel configuration, thereby improving the mechanical properties of the polymeric web. Upon subsequently heating of certain unrestrained, unannealed, biaxially-oriented sheet of polymer to its orientation temperature, heat-shrinkage may be produced. Following orientation, the biaxially-oriented polymer web is preferably cooled and then heated to an elevated temperature, most preferably to an elevated temperature which is above the glass transition temperature and below the crystalline melting point of the polymer. This reheating step, which may be referred to as annealing or heat setting, is performed in order to provide a polymeric web of uniform flat width. In accordance with the present invention, the biaxially-oriented polymer web may be used to form a film layer is heated to an elevated temperature in order to provide a packaging film with an unrestrained linear thermal shrinkage in the machine direction and transverse direction of less than 5%, preferably, less than 2% at 85° C. as measured in accordance with ASTM D-2732-96 test method, which is incorporated herein by reference. The biaxially-oriented polymeric web can be annealed or heated to an elevated temperature either in-line with (and subsequent to) or off-line from (in a separate process) the orientation process. However, an annealing process which is in-line with the orientation process is preferred.

As used herein, the term "adhesive" refers to a polymeric material serving a primary purpose or function of adhering two surfaces to one another. In the present invention, the adhesive may adhere one film layer surface to another film layer surface or one area of a film layer surface to another area of the same film layer surface. The adhesive may comprise any polymer, copolymer or blend of polymers having a polar group thereon, or any other polymer, homopolymer, copolymer or blend of polymers including modified and unmodified polymers, e.g., grafted copolymers, which provide sufficient interlayer adhesion to adjacent layers comprising otherwise nonadhering polymers. Adhesive compositions of the present invention may include, but are not limited to, modified and unmodified polyolefins, preferably polyethylene, most preferably, ethylene/α-olefin copolymer, modified and unmodified acrylate resin, preferably selected from the group consisting of ethylene/vinyl acrylate copolymer, ethylene/ethyl acrylate copolymer, ethylene/butyl acrylate copolymer, or blends thereof.

The phrase "thermoplastic oxygen barrier" refers to any polymeric material which will control the oxygen permeability of the entire film. For perishable food packaging applications, the oxygen transmission rate (OTR) desirably should be minimized. The term "oxygen transmission rate" is defined herein as the amount of oxygen in cubic centimeters ($cm^3$) which will pass through a 100 in.$^2$ of film in 24 hr. at 0% R.H. and 23° C. (or $cm^3$/100 in.$^2$ over 24 hr. at 0% R.H. and 23° C.). The thickness (gauge) of the film has a direct relationship on the oxygen transmission rate. Packaging films which are useful as an oxygen barrier are required to have an OTR value of from about 0–10.0 $cm^3$/100 in.$^2$ over 24 hr.at 0% R.H. and 23° C. at 1.0 mils or less. Oxygen transmission may be measured according to ASTM D-3985-81 which is incorporated herein by reference.

The thermoplastic oxygen barrier of the present invention may include, but is not limited to, polyamides, ethylene/vinyl alcohol copolymers, polyvinylidene chlorides or blends thereof. Preferably, the thermoplastic oxygen barrier of the present invention may includes a blend of polyamides. More preferably, the thermoplastic oxygen barrier includes a blend comprising between about 71–99% (wt.) of a crystalline polyamide selected form the group consisting of nylon 4,6 (polytetramethylene adipamide), nylon 6 (polycaprolactam), nylon 6,6 (polyhexamethylene adipamide), nylon 6,9 (polyhexamethylene nonanediamide), nylon 6,10 (polyhexamethylene sebacamide), nylon 6,12 (polyhexamethylene dodecanediamide), nylon 6/12 copolymer (polycaprolactam/dodecanediamide), nylon 6,6/6 copolymer (polyhexamethylene adipamide/caprolactam), nylon 11 (polyundecanolactam), nylon 12 (polyauryllactam) or blends thereof, and between about 1–29% (wt.) of an amorphous polyamide. Most preferably, the thermoplastic oxygen barrier may include a polyamide blend of between about 85% (wt.) of a polyamide selected from the group consisting of nylon 4,6 (polytetramethylene adipamide), nylon 6 (polycaprolactam), nylon 6,6 (polyhexamethylene adipamide), nylon 6,9 (polyhexamethylene nonanediamide), nylon 6,10 (polyhexamethylene sebacamide), nylon 6,12 (polyhexamethylene dodecanediamide), nylon 6/12 copolymer (polycaprolactam/dodecanediamide), nylon 6,6/6 copolymer (polyhexamethylene adipamide/caprolactam), nylon 11 (polyundecanolactam), nylon 12 (polyauryllactam) or blends thereof, and about 15% (wt.) of an amorphous polyamide.

As used herein, the term "polyamide" refers to homopolymers, copolymers, or terpolymers having an amide linkage between monomer units which may be formed by any method known to those skill in the art. Useful polyamide homopolymers include nylon 6 (polycaprolactam), nylon 11

(polyundecanolactam), nylon 12 (polylauryllactam), and the like. Other useful polyamide homopolymers also include nylon 4,2 (polytetramethylene ethylenediamide), nylon 4,6 (polytetramethylene adipamide), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 7,7 (polyheptamethylene pimelamide), nylon 8,8 (polyoctamethylene suberamide), nylon 9,9 (polynonamethylene azelamide), nylon 10,9 (polydecamethylene azelamide), nylon 12,12 (polydodecamethylene dodecanediamide), and the like. Useful polyamide copolymers include nylon 6,6/6 copolymer (polyhexamethylene adipamide/caprolactam copolymer), nylon 6/6,6 copolymer (polycaprolactam/hexamethylene adipamide copolymer), nylon 6,2/6,2 copolymer (polyhexamethylene ethylenediamide/hexamethylene ethylenediamide copolymer), nylon 6,6/6,9/6 copolymer (polyhexamethylene adipamide/hexamethylene azelaiamide/caprolactam copolymer), as well as other nylons which are not particularly delineated here. Exemplary of even more suitable polyamides include nylon 4,I, nylon 6,I, nylon 6,6/6I copolymer, nylon 6,6/6T copolymer, MXD6 (poly-m-xylylene adipamide), nylon 6T/6I copolymer, nylon 6/MXDT/I copolymer, nylon MXDI, poly-p-xylylene adipamide, polyhexamethylene terephthalamide, polydodecamethylene terephthalamide and the like.

As used herein, the phrase "amorphous polyamide" refers to polyamides or nylons with an absence of a regular three-dimensional arrangement of molecules or subunits of molecules extending over distances, which are large relative to atomic dimensions. However, regularity of structure exists on a local scale. See, "Amorphous Polymers," in *Encyclopedia of Polymer Science and Engineering*, 2nd Ed., pp. 789–842 (J. Wiley & Sons, Inc. 1985). This document has a Library of Congress Catalogue Card Number of 84-19713. In particular, the term "amorphous polyamide" as used with respect to the present invention refers to a material recognized by one skilled in the art of differential scanning calorimetry (DSC) as having no measurable melting point (less than 0.5 cal/g) or no heat of fusion as measured by DSC using ASTM 3417-83. Such nylons include those amorphous nylons prepared from condensation polymerization reactions of diamines with dicarboxylic acids. For example, an aliphatic diamine is combined with an aromatic dicarboxylic acid, or an aromatic diamine is combined with an aliphatic dicarboxylic acid to give suitable amorphous nylons.

As used herein, the phrase "ethylene/vinyl alcohol copolymer" or EVOH, refers to polymerized ethylene vinyl alcohol. Ethylene/vinyl alcohol copolymers include saponified or hydrolyzed ethylene/vinyl acrylate copolymers, and refers to a vinyl alcohol copolymer having an ethylene comonomer, and prepared by, for example, hydrolysis of vinyl acrylate copolymers or by chemical reactions with vinyl alcohol. The degree of hydrolysis is preferably at least 50%, and more preferably, at least 85%. Preferably, ethylene/vinyl alcohol copolymers comprise from about 28–48 mole % ethylene, more preferably, from about 32–44 mole % ethylene, and even more preferably, from about 38–44 mole % ethylene.

As used herein, the term "polyolefin" refers to homopolymers, copolymers, including e.g. bipolymers, terpolymers, etc., having a methylene linkage between monomer units which may be formed by any method known to those of skill in the art. Suitable examples of polyolefins include polyethylene, low density polyethylene, linear low density polyethylene, very low density polyethylene, ultra low density polyethylene, medium density polyethylene, high density polyethylene, polyethylenes comprising copolymers of ethylene with one or more alpha-olefins (α-olefins) such as butene-1, hexene-1, octene-1, or the like as a comonomer, linear low density polyethylene, very low density polyethylene, ultra low density polyethylene, ethylene/propylene copolymers, polypropylene, propylene/ethylene copolymer, polyisoprene, polybutylene, polybutene, poly-3-methylbutene-1, poly-4-methylpentene-1, ionomers and the like.

As used herein, the phrase "ethylene/α-olefin" refers to a modified or unmodified copolymer produced by the co-polymerization of ethylene and any one or more α-olefin. The α-olefin in the present invention may have between 3–20 pendant carbon atoms. The co-polymerization of ethylene and an α-olefin may be produced by heterogeneous catalysis, i.e., co-polymerization reactions with Ziegler-Natta catalysis systems, for example, metal halides activated by an organometallic catalyst, i.e., titanium chloride, optionally containing magnesium chloride, complexed to trialkyl aluminum and may be found in patents such as U.S. Pat. No. 4,302,565 to Goeke, et al. and U.S. Pat. No. 4,302,566 to Karol, et al., both of which are hereby incorporated, in their entireties, by reference thereto. Heterogeneous catalyzed copolymers of ethylene and an α-olefin may include linear low density polyethylene, very low density polyethylene and ultra low density polyethylene. These copolymers of this type are available from, for example, The Dow Chemical Company, of Midland, Mich., U.S.A. and sold under the trademark DOWLEX™ resins.

Additionally, the co-polymerization of ethylene and a α-olefin may also be produced by homogeneous catalysis, for example, co-polymerization reactions with metallocene catalysis systems which include constrained geometry catalysts, i.e., monocyclopentadienyl transition-metal complexes taught in U.S. Pat. No. 5,026,798, to Canich, the teachings of which are incorporated herein by reference. Homogeneous catalyzed ethylene/α-olefin copolymers may include modified or unmodified ethylene/α-olefin copolymers having a long-chain branched (8–20 pendant carbons atoms) α-olefin comonomer available from The Dow Chemical Company, known as AFFINITY™ and ATTANE™ resins, TAFMER™ linear copolymers obtainable from the Mitsui Petrochemical Corporation of Tokyo, Japan and modified or unmodified ethylene/α-olefin copolymers having a short-chain branched (3–6 pendant carbons atoms) α-olefin comonomer known as EXACT™ resins obtainable from ExxonMobil Chemical Company of Houston, Tex., U.S.A.

In general, homogeneous catalyzed ethylene/α-olefin copolymers may be characterized by one or more methods known to those of skill in the art, such as molecular weight distribution ($M_w/M_n$), composition distribution breadth index (CDBI), narrow melting point range, and single melt point behavior. The molecular weight distribution ($M_w/M_n$), also known as "polydispersity," can be determined by gel permeation chromatography (GPC) where $M_w$ is defined as the weight-average molecular weight and $M_n$ is defined as the number-average molecular weight. The molecular weight determination of polymers and copolymers can be measured as outlined in ASTM D-3593-80, which is incorporated herein in its entirety by reference. Ethylene/α-olefin copolymers of the present invention may be homogeneous catalyzed copolymers of ethylene and an α-olefin which may have a $M_w/M_w$ of less than 2.7. The composition distribution breadth index (CDBI) of the homogeneous catalyzed copolymers of ethylene and an α-olefin will generally be greater than about 70%. This is contrasted with heterogeneous catalyzed copolymers of ethylene and an α-olefin which may have a broad composition distribution index of generally less than 55%. The CDBI is defined as the weight percent of the copolymer molecules having a comonomer content within 50 percent (i.e., plus or minus 50%) of the median total molar comonomer content. The Composition Distribution Breadth Index (CDBI) may be determined via the technique of Temperature Rising Elution Fractionation (TREF) as described by Wild, et al., *Journal of Polymer Science, Poly. Phys. Ed.*, Vol. 20, p. 441 (1982) and U.S. Pat. No. 4,798,081, which are both incorporated herein, in their entireties, by reference.

In general, homogeneous catalyzed ethylene/α-olefin copolymers may exhibit an essentially singular melting point characteristic, with a melting point ($T_m$), determined by Differential Scanning Calorimetry (DSC). As used herein, "essentially singular melting point" means that at least about 80%, by weight, of the material corresponds to a single $T_m$ peak. DSC measurements may be made on a Perkin Elmer System 7 Thermal Analysis System according to ASTM D-3418, which is hereby incorporated, in its entirety, by reference thereto. As used herein, the term "modified" refers to a chemical derivative, e.g. one having any form of anhydride functionality, such as anhydride of maleic acid, crotonic acid, citraconic acid, itaconic acid, fumaric acid, etc., whether grafted onto a polymer, copolymerized with a polymer, or blended with one or more polymers, and is also inclusive of derivatives of such functionalities, such as acids, esters, and metal salts derived therefrom.

As used herein, the phrase "acrylate-based resin" refers to homopolymers, copolymers, including e.g. bipolymers, terpolymers, etc., having an acrylate moiety in at least one of the repeating units forming the backbone of the polymer. In general, acrylate-based resin are also known as polyalkyl acrylates. Acrylate resins or polyalkyl acrylates may be prepared by any method known to those skill in the art. Suitable examples of these resins for use in the present invention include ethylene/vinyl acrylate copolymers (EVA), ethylene/methacrylate copolymers (EMA), ethylene/butyl acrylate copolymers (EBA), and the like.

As used herein, the phrase "external-surface layer" refers to any film layer of a multilayer film having less than two of its principal surfaces directly adhered to another layer of the film.

As used herein, the term "sealant" refers to a layer which is heat sealable to itself, i.e., be capable of fusion bonding by conventional indirect heating means which generate sufficient heat on at least one film contact surface for conduction to the contiguous film contact surface and formation of a bond interface therebetween without loss of the film integrity. Advantageously, the bond interface must be sufficiently thermally stable to prevent gas or liquid leakage therethrough. Suitable examples of sealants for the present invention include, but are not limited to, polyolefins, including polyethylenes, polypropylenes, polybutylenes, ionomers, ethylene/α-olefin copolymers and the like.

The multilayered films of the present invention may be made by any suitable and known film-making process, e.g., cast or blown through either an annular or flat die, and is preferably fully coextruded. As used herein, the term "coextruded" refers to the process of extruding two or more materials through a single die with two or more orifices arranged so that the extrudates merge and weld together into a laminar structure before chilling and solidifying. The film of the present invention may be generally prepared from dry resins which are melted in an extruder and passed trough a die to form the primary film material, most commonly in a tube form. The well-known two step "double bubble" or trapped bubble process may be used to prepare the multilayer films of the present invention.

One embodiment of the double bubble process is described in U.S. Pat. No. 3,456,044 to Pahlke, which is incorporated herein by reference. In the Pahlke-type double bubble process a primary tube is extruded, cooled, reheated and the tube is simultaneously stretched in the machine direction by operating longitudinally spaced nip rolls at different speeds, and in the transverse direction by inflating air inside the tube. Suitable stretch ratios are between 2–6 with ratios of between 3–5 preferred. In the multilayered films of the present invention, all layers were simultaneously coextruded, cooled via water, chilled metal roll, or air quenching, and then may be reheated for biaxial orientation.

Unless otherwise noted, the thermoplastic resins utilized in the present invention are generally commercially available in pellet form and, as generally recognized in the art, may be melt blended or mechanically mixed by well-known methods using commercially available equipment including tumblers, mixers or blenders. Also, if desired, well known additives such as processing aids, slip agents, anti-blocking agents and pigments, and mixtures thereof may be incorporated into the film, by blending prior to extrusion. The resins and any additives are introduced to an extruder where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other processing parameters chosen.

In the practice of this invention, it may be desirable to irradiated the entire film to cause crosslinking of at least one layer of the film to improve the abuse and/or puncture resistance and other physical characteristics of the film. Crosslinking is the predominant reaction which occurs on irradiation of many polymers and results in the formation of carbon-carbon bonds between polymer chains. Crosslinking may be accomplished, for example, by irradiation using high energy electrons, gamma-rays, beta particles and the like. The irradiation source can be any electron beam generator operating in a range of about 150–6000 kilovolts (6 megavolts) with a power output capable of supplying the desired dosage. The voltage can be adjusted to appropriate levels which may be for example 1–6 million volts or higher or lower. Many apparatus for irradiating films are known to those skilled in the art. The most preferred amount of radiation is dependent upon the film and its end use.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

Referring now to FIG. 1, film 10 represents one example of a three-layer embodiment of the present invention. Film 10 is depicted having a first layer 11, a second layer 12 positioned between first layer 11 and third layer 13. First layer 11, second layer 12 and third layer 13 each comprises materials as outlined hereinabove.

Figure 2:
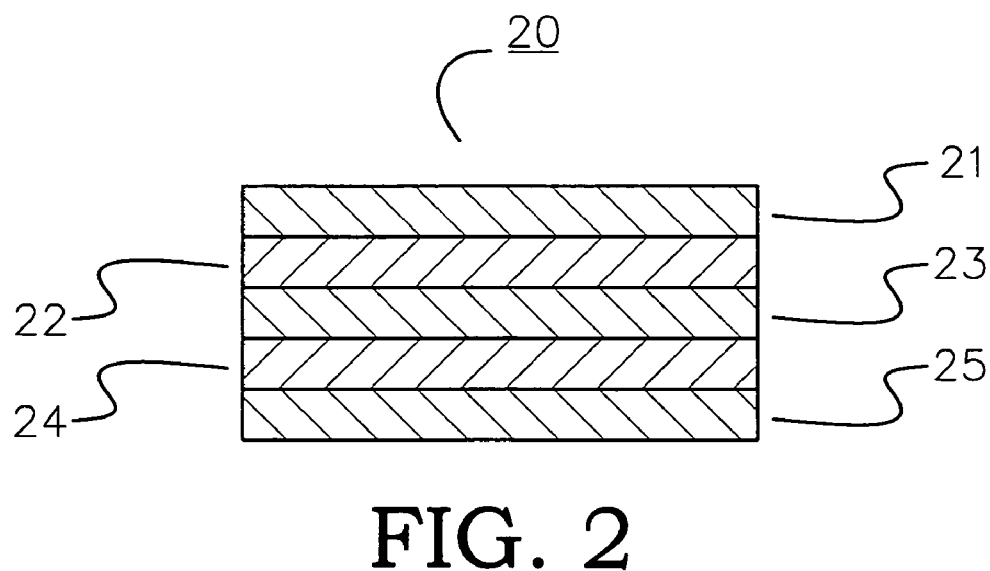
FIG. 2 is a cross-sectional view of a multilayer structure having five layers according to the present invention.

Referring now to FIG. 2, film 20 represents one example of a five-layer embodiment of the present invention. Film 20 is depicted having a first layer 21, a second layer 22 positioned between first layer 21 and third layer 23, fourth layer 24, and fifth layer 25. First layer 11, second layer 12, third layer 13, fourth layer 24, and fifth layer 25 each comprises materials as outlined hereinabove.

Figure 3:
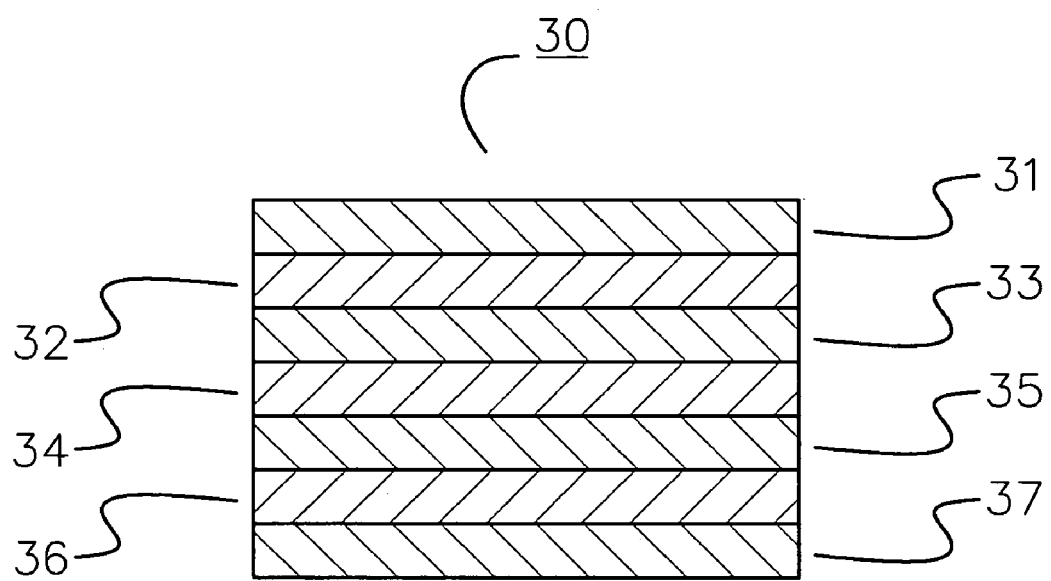
FIG. 3 is a cross-sectional view of a multilayer structure having seven layers according to the present invention.

Referring now to FIG. 3, film 30 represents one example of a seven-layer embodiment of the present invention. Film 30 is depicted having a first layer 31, a second layer 32 positioned between first layer 31 and third layer 33, fourth layer 34, fifth layer 35, sixth layer 36, and seventh layer 37. First layer 11, second layer 12, third layer 13, fourth layer 24, fifth layer 25, sixth layer 36, and seventh layer each comprises materials as outlined hereinabove.

EXAMPLES

Example 1–2

It is to be understood, the present invention is not restricted to the following examples within the scope of the invention.

Tables 1–2, below are illustrative of a three-layer coextruded film according to the present invention. Tables 1–2 provide the details the identity of the various materials present in each of the film layers, the arrangement of each of the film layers, and the thickness of each of the film layers.

TABLE 1

Example 1

| Film Layer | Material | Thickness |
|---|---|---|
| First | Polyethylene terephthalate (PET-1) | 20% |
| Second | Blend of ethylene/methacrylate + modified polyethylene + unmodified polyethylene (Adhesive-1) | 55% |
| Third | Blend of polyamides (Barrier-1) | 25% |

TABLE 2

Example 2

| Film Layer | Material | Thickness |
|---|---|---|
| First | Polyethylene terephthalate (PET-1) | 20% |
| Second | Blend of ethylene/methacrylate + modified polyethylene + unmodified polyethylene (Adhesive-2) | 55% |
| Third | Ethylene/vinyl alcohol copolymer (Barrier-2) | 25% |

In Table 1–2, above, Examples 1–2 may have a first layer comprises polyethylene terephthalate copolymer (PET-1) and polyethylene terephthalate additives, which are dried prior to being mixed together. The polyethylene terephthalate is a copolymer having a reported density of about 1.27 g/cm$^3$, an inherent viscosity of 0.70, a 45° gloss of 108 Hunter Units (HU) and is available under the trademark EASTAR™ Copolyester 6763 from Eastman Chemical Company, Kingsport, Tenn., U.S.A.

For Examples 1–2, the second layer may be an adhesive (Adhesive-1) comprising a blend of 60% (by weight relative to the total weight of the second layer) of ethylene/methacrylate copolymer (EMA) having methyl acrylate content of 22%, a density of 0.948 g/cm$^3$, a melt index of 2.0 g/10 min., being available under the product name SP1330 from Eastman Chemical Company, Kingsport, Tenn., U.S.A., 10% (by weight relative to the total weight of the second layer) of anhydride-modified linear low density polyethylene having a density of 0.92 g/cm$^3$., a melting point of 125° C., a melt index of 1.5 g/10 min., sold under the trademark BYNEL® 41E712 which is available from E.I. de Pont de Nemours and Company, Wilmington, Del., U.S.A., and 30% (by weight relative to the total weight of the second layer) ultra low density polyethylene was having a density of 0.912 g/cm$^3$, a melt index of 1.0 g/10 min., and a melting point of 123° C., sold under the product name ATTANE® 4201G and obtainable from The Dow Chemical Company, Midland, Mich., U.S.A.

For Example 1, the third layer may include an oxygen barrier of a polyamide blend (Barrier-1) of 85% (by weight relative to the total weight of the third layer) nylon 6 having a density of 1.12 g/cm$^3$, a melting point of a 220° C., a recrystallization temperature (as measured by deferential scanning calorimetry (DSC)) of 176° C., being available under the trademark ULTRAMID™ B36 from BASF Corporation, Mount Olive, N.J., U.S.A.; and 15% (by weight relative to the total weight of the third layer) amorphous nylon having a density of 1.19 g/cm$^3$, a glass transition temperature of 127° C., a heat deflection temperature at 66 psi of 126° C., and is sold under the trademark SELAR™ PA 3426 by E.I. de Pont de Nemours and Company, Wilmington, Del., U.S.A.

For Example 2, the third layer may comprise an oxygen barrier of an ethylene/vinyl alcohol copolymer (Barrier-2), preferably an ethylene/vinyl alcohol copolymer having a reported bulk density of 0.64–0.74 g/cm$^3$, a relative density of 1.13–1.22 g/cm$^3$, a melting point of 164–188° C., such as that sold under the trademark SOARNOL™ ET3803 and available from the Nippon Synthetic Chemical Industry Company, Ltd. (Nippon Gohsei), Osaka, Japan.

In Example 1–2, in accordance with the present invention, a multilayer thermoformable structures are formed into a film by the following procedure: Each layer is melt plastified in a separate extruder connected to an annular coextrusion die from which the heat plastified layers are coextruded forming a tube or bubble. The bubble has a first layer, a second layer and a third layer. The first and third layers are directly attached to opposing sides of the second core layer.

For each layer, the resin or resin mixture are fed from a hopper into an attached single screw extruder where the resin or resin mixture are heat plastified and extruded through a three layer coextrusion die into a tube or single-bubble. The extruder barrel temperature for the first layer is 500° F. (260° C.) and for the second and third layers is about 520° F. (271° C.). The bubble is maintained at a width of less than 53 inches. The extruded multilayer bubble is quenched against a cooled solid surface. The cooled bubble is flattened by passage through a pair of nip rollers and the resultant films of Example 1–2 have an average gauge of about 5 mils.

Examples 3-4

Tables 3-4, below are illustrative of a five-layer coextruded film according to the present invention. Tables 3-4 provide the details the identity of the various materials present in each of the film layers, the arrangement of each of the film layers, and the thickness of each of the film layers.

TABLE 3

Example 3

| Film Layer | Material | Thickness |
|---|---|---|
| First | Polyethylene terephthalate (PET-1) | 25% |
| Second | Blend of polyethylene/methacrylate + modified polyethylene + unmodified polyethylene (Adhesive-1) | 17% |
| Third | Blend of polyamides (Barrier-1) | 15% |
| Fourth | Modified polyethylene (Adhesive-2) | 18% |
| Fifth | Ionomer | 25% |

TABLE 4

Example 4

| Film Layer | Material | Thickness |
|---|---|---|
| First | Polyethylene terephthalate (PET-1) | 25% |
| Second | Blend of ethylene/methacrylate + modified polyethylene + unmodified polyethylene (Adhesive-1) | 17% |
| Third | Ethylene/vinyl alcohol (Barrier-2) | 15% |
| Fourth | Blend of ethylene/methacrylate + modified polyethylene + unmodified polyethylene (Adhesive-1) | 18% |
| Fifth | Polyethylene terephthalate (PET-1) | 25% |

In Tables 3-4, above, Example 3-4 the first layer may comprise a polyethylene terephthalate copolymer (PET-1) and polyethylene terephthalate additives, which are dried prior to being mixed together. The polyethylene terephthalate copolymer had a reported density of about 1.27 g/cm3, an inherent viscosity of 0.70, a 45° gloss of 108 Hunter Units (HU) and was available under the trademark EASTAR™ Copolyester 6763 from Eastman Chemical Company, Kingsport, Tenn., U.S.A.

For Example 3-4, the second layer may comprise an adhesive (Adhesive-1) comprising a blend of 60% (by weight relative to the total weight of the second layer) of ethylene/methacrylate copolymer (EMA) having methyl acrylate content of 22%, a density of 0.948 g/cm$^3$, a melt index of 2.0 g/10 min., being available under the product name SP1330 from Eastman Chemical Company, Kingsport, Tenn., U.S.A., 10% (by weight relative to the total weight of the second layer) of anhydride-modified linear low density polyethylene having a density of 0.92 g/cm$^3$., a melting point of 125° C., a melt index of 1.5 g/10 min., sold under the trademark BYNEL® 41E712 which is available from E.I. de Pont de Nemours and Company, Wilmington, Del., U.S.A., and 30% (by weight relative to the total weight of the second layer) polyethylene was having a density of 0.918 g/cm$^3$, a melt index of 1.0 g/10 min., and a melting point of 120° C., sold under the product name LL 1001 and obtainable from ExxonMobil Chemical Company of Houston, Tex., U.S.A.

For Example 3, the third layer may include an oxygen barrier of a polyamide blend (Barrier-1) of 85% (by weight relative to the total weight of the third layer) nylon 6 having a density of 1.12 g/cm$^3$, a melting point of a 220° C., a recrystallization temperature (as measured by deferential scanning calorimetry (DSC)) of 176° C., being available under the trademark ULTRAMID™ B36 from BASF Corporation, Mount Olive, N.J., U.S.A.; and 15% (by weight relative to the total weight of the third layer) amorphous nylon having a density of 1.19 g/cm$^3$, a glass transition temperature of 127° C., a heat deflection temperature at 66 psi of 126° C., and is sold under the trademark SELAR® PA 3426 by E.I. de Pont de Nemours and Company, Wilmington, Del., U.S.A.

For Example 4, the third layer may include an oxygen barrier of an ethylene/vinyl alcohol copolymer (Barrier-2), preferably an ethylene/vinyl alcohol copolymer having a reported bulk density of 0.64–0.74 g/cm$^3$, a relative density of 1.13–1.22 g/cm$^3$, a melting point of 164–188° C., such as that sold under the trademark SOARNOL™ ET3803 and available from the Nippon Synthetic Chemical Industry Company, Ltd. (Nippon Gohsei), Osaka, Japan.

For Example 3, the fourth layer may comprise an adhesive (Adhesive-2) that includes a anhydride-modified polyethylene having a density of 0.941 g/cm$^3$, melt flow index of 5.0 g/10 minutes, a Vicat softening point of 48° C., and available under the trademark TYMOR™ 72X06 from Rohm and Haas Company, Philadelphia, Pa., U.S.A.

For Example 4, the fourth layer may be identical to that used in the second layer of this example as described hereinabove.

For Example 3, the fifth layer may include an ionomer comprising a partial zinc salt of ethylene methacrylic acid copolymers having a density of 0.940 g/cm$^3$, a melt flow index at 190° C. of 1.30 g/10 min., a Vicat softening point of 165° F. (73.9° C.), and which is sold under the trademark SURLYN™ 1601 by E.I. de Pont de Nemours and Company, Wilmington, Del. U.S.A.

For Example 4, the fifth layer may comprise a polyethylene terephthalate (PET-1) identical to that in the first layer of this example as described hereinabove.

The films of Example 3-4 may have an average gauge of between 4-5 mils.

Examples 5-8

Tables 5-8, below are illustrative of a seven-layer coextruded film according to the present invention. Tables 5-8 provide the details the identity of the various materials present in each of the film layers, the arrangement of each of the film layers, and the thickness of each of the film layers.

TABLE 5

Example 5

| Film Layer | Material | Thickness |
|---|---|---|
| First | Polyethylene terephthalate (PET-1) | 20% |
| Second | Modified polyethylene (Adhesive-2) | 13% |

TABLE 5-continued

Example 5

| Film Layer | Material | Thickness |
| --- | --- | --- |
| Third | Blend of polyamides (Barrier-1) | 14% |
| Fourth | Ethylene/vinyl alcohol (Barrier-2) | 9% |
| Fifth | Blend of polyamides (Barrier-1) | 14% |
| Sixth | Modified polyethylene (Adhesive-2) | 12% |
| Seventh | Ionomer | 18% |

TABLE 6

Example 6

| Film Layer | Material | Thickness |
| --- | --- | --- |
| First | Polyethylene terephthalate (PET-2) | 20% |
| Second | Modified polyethylene (Adhesive-2) | 13% |
| Third | Blend of polyamides (Barrier-1) | 14% |
| Fourth | Ethylene/vinyl alcohol (Barrier-2) | 9% |
| Fifth | Blend of polyamides (Barrier-1) | 14% |
| Sixth | Modified polyethylene (Adhesive-2) | 12% |
| Seventh | Ionomer | 18% |

TABLE 7

Example 7

| Film Layer | Material | Thickness |
| --- | --- | --- |
| First | Polyethylene terephthalate (PET-2) | 20% |
| Second | Blend of ethylene/methacrylate + modified polyethylene + unmodified polyethylene (Adhesive-1) | 13% |
| Third | Blend of polyamides (Barrier-1) | 14% |
| Fourth | Ethylene/vinyl alcohol (Barrier-2) | 9% |
| Fifth | Blend of polyamides (Barrier-1) | 14% |
| Sixth | Modified polyethylene (Adhesive-2) | 12% |
| Seventh | Ionomer | 18% |

TABLE 8

Example 8

| Film Layer | Material | Thickness |
| --- | --- | --- |
| First | Polyethylene terephthalate (PET-2) | 20% |
| Second | Blend of ethylene/methacrylate + modified polyethylene + unmodified polyethylene (Adhesive-1) | 13% |
| Third | Blend of polyamides (Barrier-1) | 14% |
| Fourth | Ethylene/vinyl alcohol (Barrier-2) | 9% |
| Fifth | Blend of polyamides (Barrier-1) | 14% |
| Sixth | Blend of ethylene/methacrylate + modified polyethylene + unmodified polyethylene (Adhesive-1) | 13% |
| Seventh | Polyethylene terephthalate (PET-2) | 17% |

TABLE 9

Example 9

| Film Layer | Material | Thickness |
| --- | --- | --- |
| First | Polyethylene terephthalate (PET-2) | 20% |
| Second | Blend of ethylene/methacrylate + modified polyethylene + unmodified polyethylene (Adhesive-1) | 13% |
| Third | Blend of polyamides (Barrier-1) | 14% |
| Fourth | Modified polyethylene (Adhesive-2) | 12% |
| Fifth | Blend of polyamides (Barrier-1) | 14% |
| Sixth | Modified polyethylene (Adhesive-2) | 12% |
| Seventh | Ionomer | 15% |

In Table 5, above, Example 5 the first layer may comprise a polyethylene terephthalate copolymer (PET-1) and polyethylene terephthalate additives, which are dried prior to being mixed together. The polyethylene terephthalate copolymer had a reported density of about 1.27 g/cm3, an inherent viscosity of 0.70, a 45° gloss of 108 Hunter Units (HU) and was available under the trademark EASTAR™ Copolyester 6763 from Eastman Chemical Company, Kingsport, Tenn., U.S.A.

In Tables 6–9, above, Examples 6–9 have a first layer comprised of a copolymer of polyethylene terephthalate and ethylene glycol (PET-2) having a reported crystalline density of about 1.4 g/cm3, an inherent viscosity of 0.80, a 45° gloss of 108 Hunter Units (HU) and is available under the trademark EASTAPAK™ Polymer 9921 from Eastman Chemical Company, Kingsport, Tenn., U.S.A.

For Examples 5–6, the second layer and sixth layer were identical adhesives (Adhesive-2), comprised of an anhydride-modified polyethylene having a reported density of 0.88 g/cm$^3$, a melt index at 190° C. of 1.0 g/10 min. and was available under the trademark ADMER® SF700 from Mitsui Petrochemical Industries, Ltd., Tokyo, Japan.

For Examples 7–9, the second layer may comprise an adhesive (Adhesive-1) of a blend of between 25–99%, preferably, 25–60% (by weight relative to the total weight of the second layer), of ethylene/methacrylate copolymer (EMA) having methyl acrylate content of 22%, a density of 0.948 g/cm$^3$, a melt index of 2.0 g/10 min., being available under the product name SP1330 from Eastman Chemical Company, Kingsport, Tenn., U.S.A., 1–75%, preferably, 1–75% (by weight relative to the total weight of the second layer) of anhydride-modified linear low density polyethylene having a density of 0.92 g/cm$^3$., a melting point of 125° C., a melt index of 1.5 g/10 min., sold under the trade name of BYNEL® 41E712 which is available from E.I. de Pont de Nemours and Company, Wilmington, Del., U.S.A., and 0–30% (by weight relative to the total weight of the second layer) polyethylene was having a density of 0.918 g/cm$^3$, a melt index of 1.0 g/10 min., and a melting point of 120° C., sold under the product name LL 1001 and obtainable from ExxonMobil Chemical Company of Houston, Tex., U.S.A.

For Examples 5–9, the third layer and fifth layer were identical oxygen barrier material (Barrier-1) of a blend of 85% (by weight) nylon 6 having a density of 1.12 g/cm$^3$, a melting point of a 220° C., a recrystallization temperature (as measured by deferential scanning calorimetry (DSC)) of 176° C., being available under the trademark ULTRAMID™ B36 from BASF Corporation, Mount Olive, N.J., U.S.A.; and 15% (by weight) amorphous nylon having a density of 1.19 g/cm$^3$, a glass transition temperature of 127° C., a heat deflection temperature at 66 psi of 126° C., and is sold under the trademark SELAR® PA 3426 by E.I. de Pont de Nemours and Company, Wilmington, Del., U.S.A.

For Examples 5–8, the fourth layer comprised an oxygen barrier (Barrier-2) of an ethylene/vinyl alcohol copolymer having a reported bulk density of 0.64–0.74 g/cm$^3$, a relative density of 1.13–1.22 g/cm$^3$, a melting point of 164–188° C., and was available under the trademark SOARNOL™ ET3803 from the Nippon Synthetic Chemical Industry Company, Ltd. (Nippon Gohsei), Osaka, Japan.

For Example 9, the fourth layer may comprise an adhesive (Adhesive-2) of an anhydride-modified polyethylene having a reported density of 0.88 g/cm$^3$, a melt index at 190° C. of 1.0 g/10 min. and was available under the trademark ADMER® SF700 from Mitsui Petrochemical Industries, Ltd., Tokyo, Japan.

For Examples 5–7 and Example 9, the sixth layer comprised an adhesive material (Adhesive-2) of an anhydride-modified polyethylene having a reported density of 0.88 g/cm$^3$, a melt index at 190° C. of 1.0 g/10 min. and was available under the trademark ADMER® SF700 from Mitsui Petrochemical Industries, Ltd., Tokyo, Japan.

For Example 8, the sixth layer may comprise an adhesive material (Adhesive-1) identical to that used in the second layer of this same example as described hereinabove.

For Examples 5–7 and Example 9, the seventh layer comprised a sealant of a partial zinc salt of ethylene methacrylic acid copolymers having a density of 0.940 g/cm$^3$, a melt flow index at 190° C. of 1.30 g/10 min., a Vicat softening point of 165° F. (73.9° C.), and was available under the trademark SURLYN® 1601 from E.I. de Pont de Nemours and Company, Wilmington, Del. U.S.A.

For Example 8, the seventh layer may be identical to the polyethylene terephthalate used for the first layer of this same example as described hereinabove.

In Examples 5–9, one extruder was used for each layer. Each extruder was connected to an annular coextrusion die from which heat plastified resins were coextruded forming a tube or single-bubble having seven layers.

The resin or resin mixture was fed from a hopper into an attached single screw extruder where the heat plastified and extruded through a seven-layer coextrusion die into a tube or single-bubble. The extruder barrel temperature for the first layer was about 500° F. (260° C.); for the second layer 510° F. (266° C.); and for the third through seventh layers, about 520° F. (271° C.). The bubble is maintained at a width of less than 53 inches. The extruded multilayer bubble is quenched against a cooled solid surface. The cooled bubble is flattened by passage through a pair of nip rollers and the resultant film of Examples 5–9 each had an average gauge between 4–6 mil.

Table 10 shows a comparison of the amount of elongation at break in the machine direction and transverse direction for a seven-layered film (Example 5) having different thicknesses in accordance with the present invention. Table 11 shows a comparison of the amount of unrestrained linear thermal shrinkage in the machine direction and transverse direction for a seven-layered film (Example 5) having different thicknesses in accordance with the present invention.

TABLE 10

COMPARISON OF % ELONGATION AT BREAK FOR EXAMPLE 5

|  | 3 mil | | 5 mil | | 10 mil | |
| --- | --- | --- | --- | --- | --- | --- |
|  | Machine | Transverse | Machine | Transverse | Machine | Transverse |
|  | 386.8 | 484.4 | 519.6 | 575.0 | 643.6 | 612.9 |
|  | 469.1 | 434.1 | 516.8 | 529.8 | 630.8 | 600.4 |
|  | 412.1 | 459.3 | 513.4 | 579.2 | 615.2 | 599.2 |
|  | 429.3 | 458.7 | 518.9 | 562.3 | 637.1 | 639.0 |
|  | 406.1 | 427.1 | 484.0 | 551.8 | 605.1 | 590.2 |
| AVE | 420.7 | 452.7 | 510.5 | 559.6 | 626.4 | 608.3 |

TABLE 11

COMPARISON OF % UNRESTRAINED LINEAR THERMAL SHRINKAGE FOR EXAMPLE 5

| Thickness | Machine Direction | Transverse Direction |
| --- | --- | --- |
| 3 mil | 0.0% | 0.0% |
| 5 mil | 1.5% | 0.5% |
| 10 mil | 1.0% | 0.0% |

Unless otherwise noted, the physical properties and performance characteristics reported herein were measured by test procedures similar to the following methods.

| | |
| --- | --- |
| Density | ASTM D-1505 |
| Melting Point | ASTM D-3418 |
| Melt Index | ASTM D-1238 |
| Molecular Weight | ASTM D-3593-80 |
| Oxygen Transmission Rate | ASTM D-3985-81 |
| Percent Elongation at Break | ASTM D-638 |
| Unrestrained Linear Thermal Shrinkage | ASTM D-2732-96 |
| Vicat Softening Temperature | ASTM D-1525 |

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A coextruded multilayered thermoformable film comprising:
   (a) a first layer comprising polyethylene terephthalate, wherein said first layer is an exterior-surface layer of said film;
   (b) a second layer of a first adhesive comprising a blend of at least an acrylate-based resin and between 1–75% (by weight) of the total weight of at said second layer either a modified polyolefin or a modified acrylate-based resin; and
   (c) a third layer comprising a thermoplastic oxygen barrier of ethylene/vinyl alcohol copolymer, polyvinylidene chloride, polyamide or blends thereof; wherein said second layer is adhered to said first layer and to said third layer.

2. A coextruded multilayered thermoformable film according to claim 1, wherein said film is nonoriented.

3. A coextruded multilayered thermoformable film according to claim 1, wherein said polyamide blend comprises a first component selected from the group consisting of nylon 4,6 (polytetramethylene adipamide), nylon 6 (polycaprolactam), nylon 6,6 (polyhexamethylene adipamide), nylon 6,9 (polyhexamethylene nonanediamide), nylon 6,10 (polyhexamethylene sebacamid), nylon 6,12 (polyhexamethylene dodecanediamide), nylon 6/12 copolymer (polycaprolactam/dodecanediamide), nylon 6,6/6 copolymer (polyhexamethylene adipamide/caprolactam), nylon 11 (polyundecanolactam), nylon 12 (polyauryllactam) and blends thereof.

4. A coextruded multilayered thermoformable film according to claim 3, wherein said first component comprises between 71–99% (by weight) of the total weight of said third layer.

5. A coextruded multilayered thermoformable film according to claim 4, wherein said first component comprises about 85% (by weight) of the total weight of said third layer.

6. A coextruded multilayered thermoformable film according to claim 1, wherein said polyamide blend comprises a second component of an amorphous polyamide.

7. A coextruded multilayered thermoformable film according to claim 6, wherein said second component comprises between 1–29% (by weight) of the total weight of said third layer.

8. A coextruded multilayered thermoformable film according to claim 7, wherein said second component comprises about 15% (by weight) of the total weight of said third layer.

9. A coextruded multilayered thermoformable film according to claim 1, wherein said acrylate-based resin of said first adhesive of said second layer comprises a material selected from the group consisting of ethylene/vinyl acrylate copolymer (EVA), ethylene/methacrylate copolymer (EMA), ethylene/butyl acrylate copolymer (EBA), and blends thereof.

10. A coextruded multilayered thermoformable film according to claim 9, wherein said acrylate-based resin comprises between 25–99% (by weight) of total weight of said second layer.

11. A coextruded multilayered thermoformable film according to claim 10, wherein said acrylate-based resin comprises between 25–60% (by weight) of total weight of said second layer.

12. A coextruded multilayered thermoformable film according to claim 1, wherein said modified polyolefin or modified acrylate-based resin comprises between 10–75% (by weight) of total weight of said second layer.

13. A coextruded multilayered thermoformable film according to claim 1, wherein said first adhesive further comprises between 0–30% (by weight of total weight of said second layer) an unmodified polyolefin.

14. A coextruded multilayered thermoformable film according to claim 1, wherein said first adhesive of said second layer further comprises an unmodified polyolefin.

15. A coextruded multilayered thermoformable film according to claim 1, further comprising a fourth layer of a thermoplastic material.

16. A coextruded multilayered thermoformable film according to claim 1, further comprising a fifth layer of a thermoplastic material.

17. A coextruded multilayered thermoformable film according to claim 1, further comprising a sixth layer of a thermoplastic material.

18. A coextruded multilayered thermoformable film according to claim 1, further comprising a seventh layer of a thermoplastic material.

19. A coextruded multilayered thermoformable film according to claim 1, wherein said film has a total thickness between 0–16 mils (0.0254 cm).

20. A coextruded multilayered thermoformable film according to claim 19, wherein said film has a total thickness between 3–7 mils (0.00762–0.01778 cm).

21. A coextruded multilayered thermoformable film according to claim 1, wherein said film has an unrestrained linear thermal shrinkage in the machine direction or the transverse direction of between 0–5% at 90° C. as measured in accordance with ASTM D-2732 test method.

22. A coextruded multilayered thermoformable film according to claim 21, wherein said film has an unrestrained linear thermal shrinkage in the machine direction or the transverse direction of between 0–2% at 90° C. as measured in accordance with ASTM D-2732 test method.

23. A coextruded multilayered thermoformable film according to claim 1, wherein said film comprises between 0–500 ppm of a transition-metal salt selected from the group consisting of manganese II, manganese III, iron II, iron III, cobalt II, cobalt III, nickel II, nickel III, copper I, copper II, rhodium II, rhodium III, rhodium IV, and ruthenium.

24. A coextruded multilayered thermoformable film according to claim 1, wherein said film has a gloss value greater than about 65 Hunter Units (HU) as measured in accordance with ASTM D-2244-85 test method.

25. A coextruded multilayered thermoformable film according to claim 1, wherein said film has an oxygen transition rate of between 0–1.0 $cm^3$/100 $in.^2$ (15.5 $cm^3/m^2$) as measured in accordance with ASTM D-3985-81 test method.

26. A coextruded multilayered thermoformable film according to claim 1, wherein said film has an elongation at break in the machine direction and in the transverse direction of greater than 250% at room temperature as measured in accordance with ASTM D-882-95 test method.

27. A coextruded multilayered thermoformable film according to claim 1, wherein said film is adapted to form a package or a component thereof suitable for storing food or non-food items.

28. A coextruded multilayered thermoformable film comprising:
   (a) a first layer comprising polyethylene terephthalate; wherein said first layer is an exterior-surface layer of said film;

(b) a second layer of a first adhesive comprising a blend of at least an acrylate-based resin and between 1–75% (by weight) of the total weight of said second layer of either a modified polyolefin or a modified acrylate-based resin;

(c) a third layer comprising a thermoplastic oxygen barrier of ethylene/vinyl alcohol copolymer, polyvinylidene chloride, polyamide or blends thereof; wherein said second layer is adhered to said first layer and to said third layer;

(d) a fourth layer of a thermoplastic material; and (e) a fifth layer of a thermoplastic material.

29. A coextruded multilayered thermoformable film according to claim 28, wherein said film is nonoriented.

30. A coextruded multilayered thermoformable film according to claim 28, wherein said polyamide blend comprises a first component selected from the group consisting of nylon 4,6 (polytetramethylene adipamide), nylon 6 (polycaprolactam), nylon 6,6 (polyhexamethylene adipamide), nylon 6,9 (polyhexamethylene nonanediamide), nylon 6,10 (polyhexamethylene sebacamide), nylon 6,12 (polyhexamethylene dodecanediamide), nylon 6/12 copolymer (polycaprolactam/dodecanediamide), nylon 6,6/6 copolymer (polyhexamethylene adipamide/caprolactam), nylon 11 (polyundecanolactam), nylon 12 (polyauryllactam) and blends thereof.

31. A coextruded multilayered thermoformable film according to claim 30, wherein said first component comprises between 71–99% (by weight) of the total weight of said third layer.

32. A coextruded multilayered thermoformable film according to claim 31, wherein said first component comprises about 85% (by weight) of the total weight of said third layer.

33. A coextruded multilayered thermoformable film according to claim 28, wherein said polyamide blend further comprises a second component of an amorphous polyamide.

34. A coextruded multilayered thermoformable film according to claim 33, wherein said second component comprises between 1–29% (by weight) of the total weight of said third layer.

35. A coextruded multilayered thermoformable film according to claim 34, wherein said second component comprises about 15% (by weight) of the total weight of said third layer.

36. A coextruded multilayered thermoformable film according to claim 28, wherein said fourth layer comprises either a thermoplastic oxygen barrier or a second adhesive.

37. A coextruded multilayered thermoformable film according to claim 36, wherein said second adhesive is free of an acrylate-based resin.

38. A coextruded multilayered thermoformable film according to claim 28, wherein said fifth layer comprises either a sealant, a polyester, or a thermoplastic oxygen barrier.

39. A coextruded multilayered thermoformable film according to claim 28, wherein said acrylate-based resin comprises a material selected from the group consisting of ethylene/vinyl acrylate copolymer (EVA), ethylene/methacrylate copolymer (EMA), ethylene/butyl acrylate copolymer (EBA), and blends thereof.

40. A coextruded multilayered thermoformable film according to claim 39 wherein said acrylate-based resin comprises between 25–99% (by weight) of the total weight of said second layer.

41. A coextruded multilayered thermoformable film according to claim 40, wherein said acrylate-based resin comprises between 25–60% (by weight) of total weight of said second layer.

42. A coextruded multilayered thermoformable film according to claim 28, wherein said modified polyolefin or modified acrylate-based resin comprises between 10–75% (by weight) of total weight of said second layer.

43. A coextruded multilayered thermoformable film according to claim 28, wherein said first adhesive further comprises between 0–30% (by weight of total weight of said second layer) an unmodified polyolefin.

44. A coextruded multilayered thermoformable film according to claim 28, further comprising a sixth layer of a thermoplastic material.

45. A coextruded multilayered thermoformable film according to claim 28, further comprising a seventh layer of a thermoplastic material.

46. A coextruded multilayered thermoformable film according to claim 28, wherein said film has a thickness between 3–16 mils (0.00762–0.01778 cm).

47. A coextruded multilayered thermoformable film according to claim 28, wherein said film has an unrestrained linear thermal shrinkage in the machine direction or the transverse direction of between 0–2% at 90° C. as measured in accordance with ASTM D-2732 test method.

48. A coextruded multilayered thermoformable film according to claim 28, wherein said film comprises between 0–500 ppm of a transition-metal salt selected from the group consisting of manganese II, manganese III, iron II, iron III, cobalt II, cobalt III, nickel II, nickel III, copper I, copper II, rhodium II, rhodium III, rhodium IV, and ruthenium.

49. A coextruded multilayered thermoformable film according to claim 28, wherein said film has a gloss value greater than about 65 Hunter Units (HU) as measured in accordance with ASTM D-2244-85 test method.

50. A coextruded multilayered thermoformable film according to claim 28, wherein said film has an oxygen transition rate of between 0–1.0 cm$^3$/100 in.$^2$ (15.5 cm$^3$/m$^2$) as measured in accordance with ASTM D-3985-81 test method.

51. A coextruded multilayered thermoformable film according to claim 28, wherein said film has an elongation at break in the machine direction and in the transverse direction of greater than 250% at room temperature as measured in accordance with ASTM D-882-95 test method.

52. A coextruded multilayered thermoformable film comprising:

(a) a first layer comprising polyethylene terephthalate; wherein said first layer is an exterior-surface layer of said film;

(b) a second layer of a first adhesive comprising a blend of at least an acrylate-based resin and between 1–75% (by weight) of the total weight of said second layer of either a modified polyolefin or a modified acrylate-based resin;

(c) a third layer comprising a thermoplastic oxygen barrier of ethylene/vinyl alcohol copolymer, polyvinylidene chloride, polyamide or blends thereof; wherein said second layer is adhered to said first layer and to said third layer;

(d) a fourth layer of a thermoplastic material;

(e) a fifth layer of a thermoplastic material;

(f) a sixth layer of a thermoplastic material; and (g) a seventh layer of a thermoplastic material.

53. A coextruded multilayered thermoformable film according to claim 52, wherein said film is nonoriented.

54. A coextruded multilayered thermoformable film according to claim 52, wherein said polyamide blend comprises a first component selected from the group consisting of nylon 4,6 (polytetramethylene adipamide), nylon 6 (polycaprolactam), nylon 6,6 (polyhexamethylene adipamide), nylon 6,9 (polyhexamethylene nonanediamide), nylon 6,10 (polyhexamethylene sebacamide), nylon 6,12 (polyhexamethylene dodecanediamide), nylon 6/12 copolymer (polycaprolactam/dodecanediamide), nylon 6,6/6 copolymer (polyhexamethylene adipamide/caprolactam), nylon 11 (polyundecanolactam), nylon 12 (polyauryllactam) and blends thereof.

55. A coextruded multilayered thermoformable film according to claim 54, wherein said first component comprises between 71–99% (by weight) of the total weight of said third layer.

56. A coextruded multilayered thermoformable film according to claim 55, wherein said first component comprises about 85% (by weight) of the total weight of said third layer.

57. A coextruded multilayered thermoformable film according to claim 52, wherein said polyamide blend further comprises a second component of an amorphous polyamide.

58. A coextruded multilayered thermoformable film according to claim 57, wherein said second component is between 1–29% (by weight) of the total weight of said third layer.

59. A coextruded multilayered thermoformable film according to claim 58, wherein said second component is about 15% (by weight) of the total weight of said third layer.

60. A coextruded multilayered thermoformable film according to claim 52, wherein said fourth layer comprises either a thermoplastic oxygen barrier or a second adhesive.

61. A coextruded multilayered thermoformable film according to claim 52, wherein said acrylate-based resin of said second layer comprises a material selected from the group consisting of ethylene/vinyl acrylate copolymer (EVA), ethylene/methacrylate copolymer (EMA), ethylene/butyl acrylate copolymer (EBA), and blends thereof.

62. A coextruded multilayered thermoformable film according to claim 61, wherein said acrylate-based resin comprises between 25–99% (by weight) of the total weight of said second layer.

63. A coextruded multilayered thermoformable film according to claim 62, wherein said acrylate-based resin comprises between 25–60% (by weight) of total weight of said second layer.

64. A coextruded multilayered thermoformable film according to claim 52, wherein said modified polyolefin or modified acrylate-based resin comprises between 10–75% (by weight) of total weight of said second layer.

65. A coextruded multilayered thermoformable film according to claim 52, wherein said first adhesive further comprises between 0–30% (by weight of total weight of said second layer) an unmodified polyolefin.

66. A coextruded multilayered thermoformable film according to claim 52, wherein said fifth layer comprises a sealant, a polyester, or a thermoplastic oxygen barrier.

67. A coextruded multilayered thermoformable film according to claim 52, wherein said sixth layer comprises either a first adhesive or a second adhesive.

68. A coextruded multilayered thermoformable film according to claims 60 or 67, wherein said second adhesive is free of an acrylate-based resin.

69. A coextruded multilayered thermoformable film according to claim 52, wherein said seventh layer comprises a sealant or a polyester.

70. A coextruded multilayered thermoformable film according to claim 52, wherein said film has a thickness between 3–16 mils (0.00762–0.01778 cm).

71. A coextruded multilayered thermoformable film according to claim 52, wherein said film has an unrestrained linear thermal shrinkage in the machine direction or the transverse direction of between 0–2% at 90° C. as measured in accordance with ASTM D-2732 test method.

72. A coextruded multilayered thermoformable film according to claim 52, wherein said film comprises between 0–500 ppm of a transition-metal salt selected from the group consisting of manganese II, manganese III, iron II, iron III, cobalt II, cobalt III, nickel II, nickel III, copper I, copper II, rhodium II, rhodium II, rhodium IV, and ruthenium.

73. A coextruded multilayered thermoformable film according to claim 52, wherein said film has a gloss value greater than about 65 Hunter Units (HU) as measured in accordance with ASTM D-2244-85 test method.

74. A coextruded multilayered thermoformable film according to claim 52, wherein said film has an oxygen transition rate of between 0–1.0 cm$^3$/100 in.$^2$ (15.5 cm$^3$/m$^2$) as measured in accordance with ASTM D-3985-81 test method.

75. A coextruded multilayered thermoformable film according to claim 52, wherein said film is adapted to form a package or a component thereof suitable for storing food or non-food items.

* * * * *

UNITED STATES PATENT AND TRADEMARK OFFICE
CERTIFICATE OF CORRECTION

PATENT NO. : 7,201,966 B2
APPLICATION NO. : 10/795567
DATED : April 10, 2007
INVENTOR(S) : Andrew John Lischefski Page 1 of 1

It is certified that error appears in the above-identified patent and that said Letters Patent is hereby corrected as shown below:

Column 3, line 57, "(Hip)" should read --(HU)--.
Claim 1, line 9, "weight of at said second layer" should read --weight of said second layer of--.
Claim 72, line 33, "rhodium II, rhodium II" should read --rhodium II, rhodium III--.

Signed and Sealed this

Twenty-second Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,201,966 B2 Page 1 of 1
APPLICATION NO. : 10/795567
DATED : April 10, 2007
INVENTOR(S) : Andrew John Lischefski It is certified that error appears in the above-identified patent and that said Letters Patent is hereby corrected as shown below:

Column 3, line 57, "(Hip)" should read --(HU)--.
Column 19, Claim 1, line 9, "weight of at said second layer" should read --weight of said second layer of--.
Column 24, Claim 72, line 33, "rhodium II, rhodium II" should read --rhodium II, rhodium III--.

This certificate supersedes the Certificate of Correction issued July 22, 2008.

Signed and Sealed this

Twelfth Day of August, 2008

JON W. DUDAS
*Director of the United States Patent and Trademark Office*